United States Patent [19]
Atkinson et al.

[11] 4,088,367
[45] May 9, 1978

[54] VEHICLE SEAT ASSEMBLY

[75] Inventors: Thomas Carl Atkinson, Chula Vista, Calif.; Clifford C. Fay, Uniondale, Pa.

[73] Assignee: Rohr Industries, Inc., Chula Vista, Calif.

[21] Appl. No.: 808,074

[22] Filed: Jun. 20, 1977

[51] Int. Cl.$^2$ .............................................. A47C 1/12
[52] U.S. Cl. .................................. 297/457; 297/183; 297/232; 297/243; 297/DIG. 2
[58] Field of Search ............... 297/183, 232, 243, 450, 297/451, 452, 454–460, DIG. 2

[56] References Cited

U.S. PATENT DOCUMENTS

| 2,797,741 | 7/1957 | Hodges et al. | 297/243 X |
| 3,041,107 | 6/1962 | Schaefer | 297/452 X |
| 3,619,006 | 11/1971 | Babecki | 297/232 X |
| 3,669,496 | 6/1972 | Chisholm | 297/457 X |
| 3,768,863 | 10/1973 | Jennings | 297/451 X |

Primary Examiner—James C. Mitchell
Attorney, Agent, or Firm—Patrick J. Schlesinger; Frank D. Gilliam

[57] ABSTRACT

A cantilevered seat for a transit vehicle having a seat shell and a back pan molded from polycarbonate structural foam plastic. The seat shell has contoured into its front surface two seat recess areas and two back recess areas. The seat shell is an integral member having a front panel with a laterally extending flange formed around its periphery. The rear surface of the seat shell has plurality of integrally molded horizontal, diagonal, and vertical structural rib members. Substantially in the center of the seat shell is a major vertical structural rib member and the matrix formed by said vertical, diagonal, and horizontal rib members is symmetrical about said major vertical rib member whereby the seat shell can be used either as a right hand mounted or a left hand mounted cantilevered seat. The back pan has integrally molded channels on its inwardly facing surface for receiving the vertical and horizontal rib members extending outwardly from the rear surface of the seat shell. The seat shell and back pan are bonded together as an integral member. The back pan has a knee recess formed in its outwardly facing surface. The seat shell also has a bottom seat bracket slot molded into its bottom surface adjacent each end of the seat shell. Top seat bracket slots are likewise molded into the seat shell along its back surface adjacent each end. These sets of seat bracket slots allow the seat to be mounted from either of its ends to a vertical wall. The seat shell additionally has a plurality of boss members integrally formed in predetermined structural rib members and these are symmetrically located in both of the upper corner areas of the back portion of the seat shell whereby passenger assist handles can be attached to the seat whether it is to be mounted from the left or the right side wall of the vehicle.

10 Claims, 10 Drawing Figures

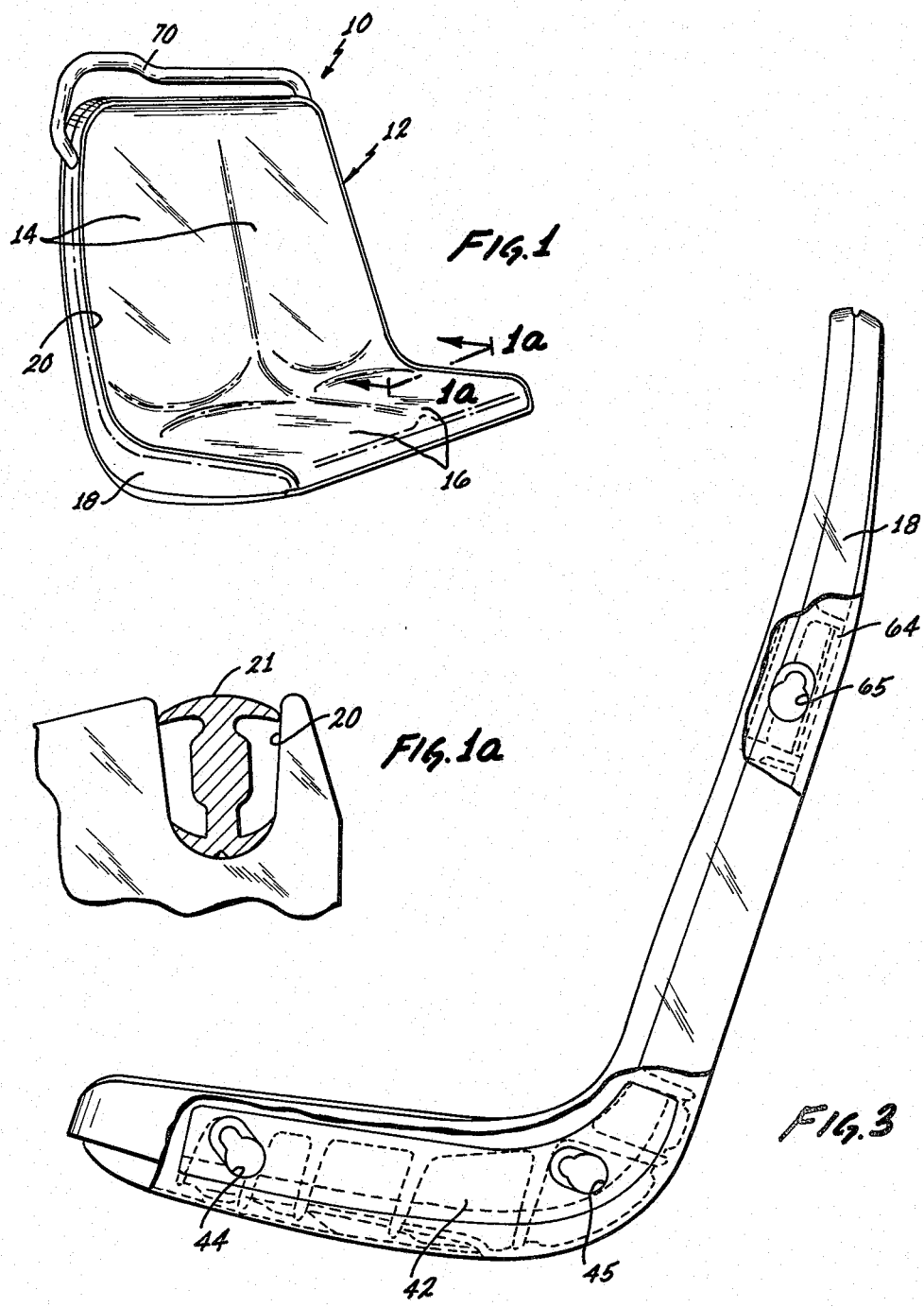

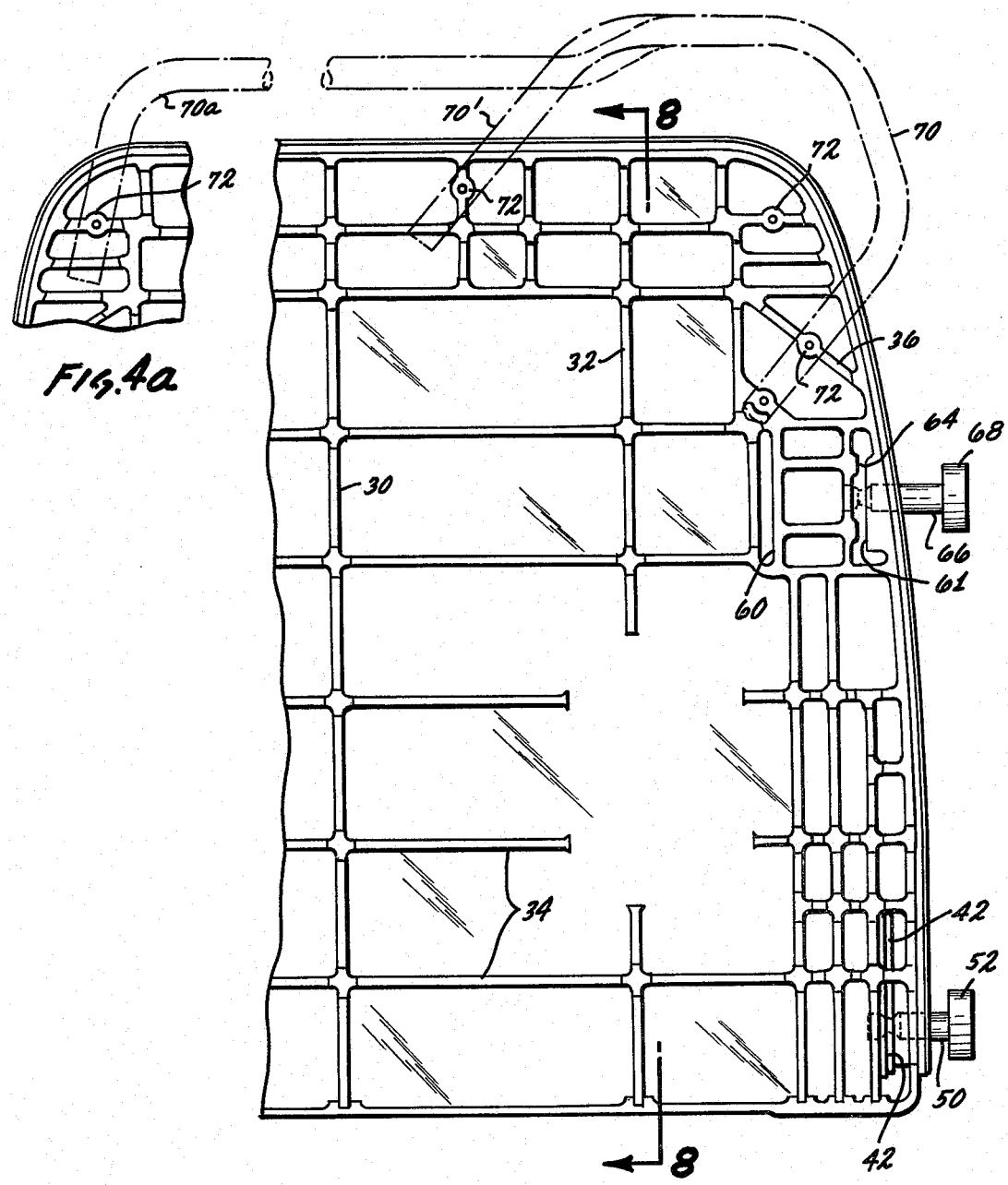

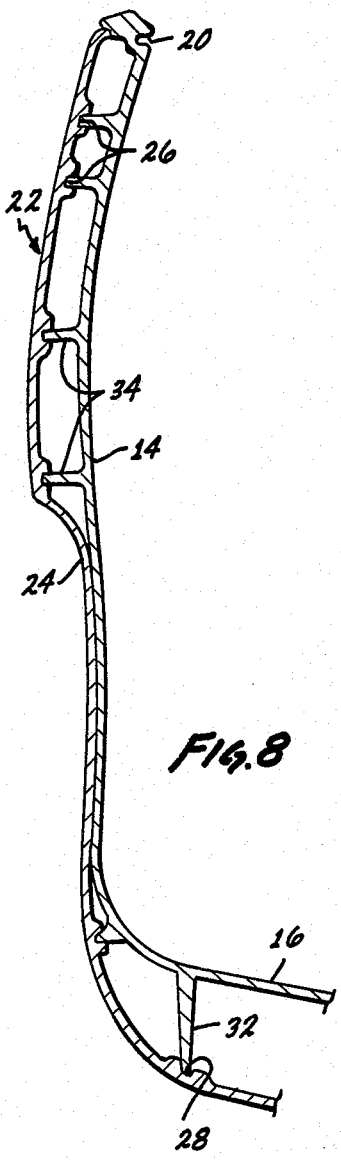
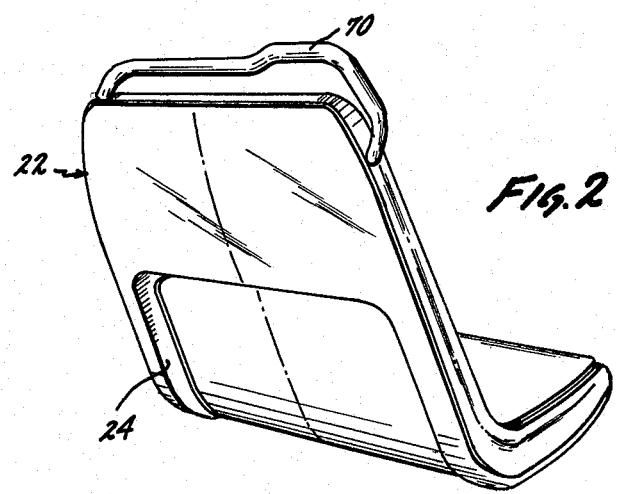
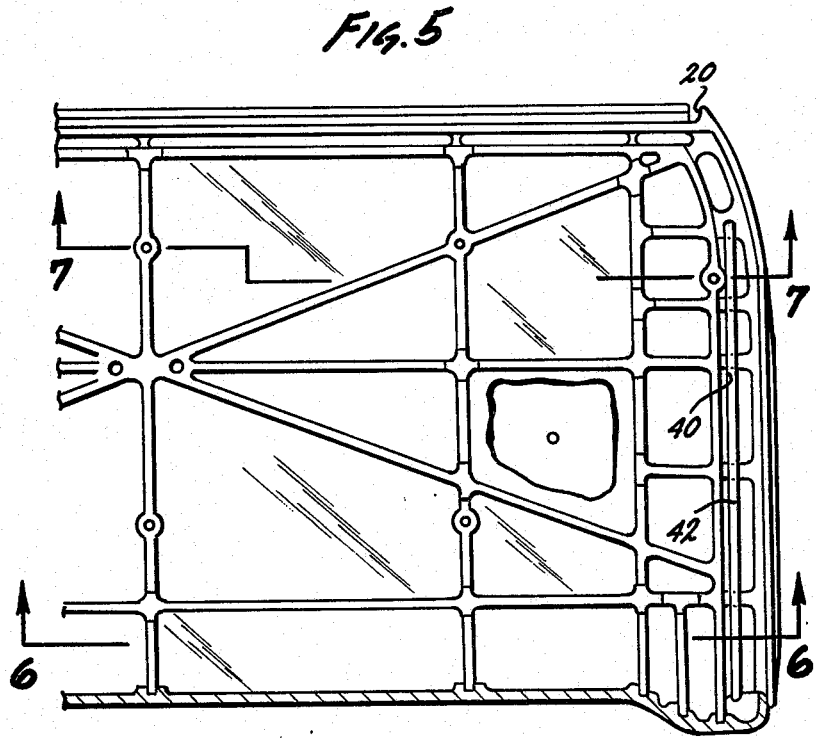

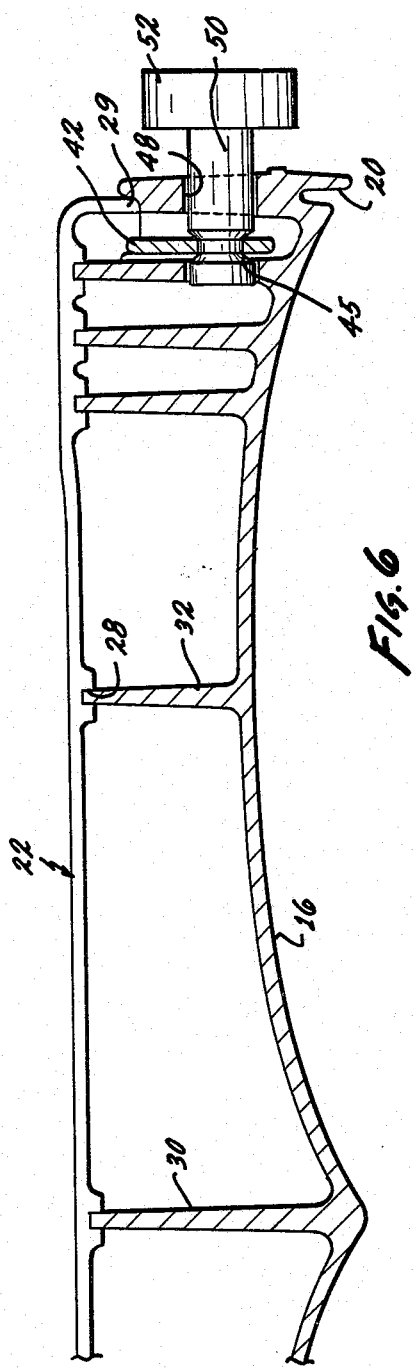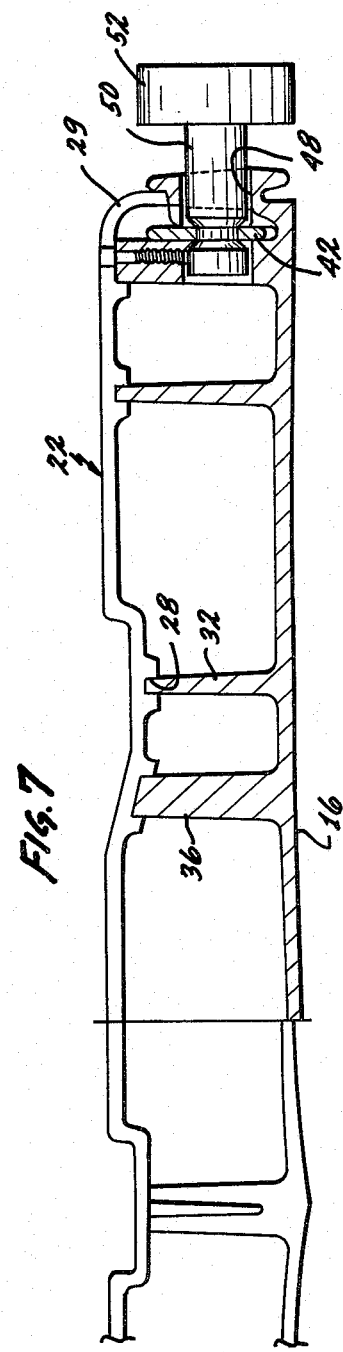

VEHICLE SEAT ASSEMBLY

BACKGROUND OF THE INVENTION

The invention relates to a seat for a transit vehicle and more particularly, to a cantilevered seat. Since a cantilevered seat for a vehicle is normally mounted to the side walls of the vehicle, the seat must necessarily have mounting structures adjacent the end to be attached to the vehicle side wall. In the past, this has necessitated the having of separate seats for mounting to the left and right side walls of the vehicle.

The cantilevered seats previously known also normally had a passenger seat handle attached to the top of the seat and these had a different orientation depending upon whether they were a left or a right side seat.

Several other cantilevered seats for vehicles required metal frames or tubing to give strength and rigidity to the seat so that it would not bend under the force of a load applied at a point spaced outwardly from the vehicle wall. These seats, because of their metal frames were quite heavy and added appreciably to the overall weight of the vehicle due to the number of seats normally on a vehicle such as a bus.

The use of vehicle seats having a shell molded from plastic is old with respect to pedestal mounted seats but is novel with respect to cantilevered vehicle seats. In these prior art vehicle seats, the structure of the seat shell was simple due to the fact that the pedestal mounting structure provided the supporting structure for the seat whereas in the cantilevered seat it must be designed to withstand compressive forces, torsional forces, and forces tending to cause deflection both from its own weight and any weight being supported upon the seat itself.

Some previous cantilevered vehicle seats have also utilized foamed plastic as a filler material between the outer skins of the seat. In these seats, however, the structural integrity of the seat was dependent upon the metal frame thereof.

It is an object of the invention to provide a novel cantilevered seat for a transit vehicle that will allow it to be used as either a left or right hand mounted seat.

It is also an object of the invention to provide a novel cantilevered seat for a transit vehicle that is molded from polycarbonate structural foam plastic that itself provides the structural integrity for the seat rather than requiring a metal frame to provide such structural integrity.

It is also an object of the invention to provide a novel cantilevered seat for a transit vehicle that is easy to install and yet will remain secure under a crash condition.

It is a further object of the invention to provide a novel cantilevered seat for a transit vehicle made from plastic and which will have a minimum amount of deflection under its own weight.

It is an additional object of the invention to provide a novel cantilevered seat for a transit vehicle that is inexpensive to manufacture and also light in weight.

SUMMARY OF THE INVENTION

Applicant's novel invention is directed to a cantilevered seat for a transit vehicle. It has a seat shell and a back pan both of which are molded from polycarbonate structural foam plastic. The seat shell has contoured into its front surface two seat recess areas and two back recess areas. The seat shell is an integral member having a front panel with a laterally extending flange formed around its periphery. The rear surface of the seat shell has a plurality of integrally molded horizontal, diagonal, and vertical structural rib members. Located substantially in the center of the seat shell is a major vertical structural rib member and the matrix formed by the vertical, diagonal, and horizontal rib members are symetrical about the major vertical rib member whereby the seat shell can be used as either a right hand mounted or a left hand mounted cantilevered seat. The back pan has integrally molded channels on its inwardly facing surface for receiving the horizontal and vertical rib members extending outwardly from the rear surface of the seat shell. These halves are bonded together by adhesive, solvent, heat, or other well known methods of bonding. The back pan has a knee recess formed in its outwardly facing surface. This is produced by having the depth dimension of the vertical and horizontal rib members directly behind the back recesses taper into the thickness of the front panel whereby the back recess of the front panel comes into contact with the knee recess portion of the back pan. This acts to give the passenger seat immediately behind the cantilevered seat an extra measure of knee room which is normally needed.

The seat shell has a bottom seat bracket slot molded into its bottom surface adjacent each end of the seat shell. This allows the seat to be mounted to a vehicle wall from either of its ends. The bottom seat bracket is made from metal and has an elongated shape with a pair of spaced mounting bolt apertures therein. The bottom seat bracket is basically J-shaped with its long dimension mounted in the horizontal portion of the seat shell and its short foot portion mounted in the upright portion of the seat shell. The bottom seat bracket acts to distribute compressive forces placed on the cantilevered seat. Once it has been determined whether the cantilevered seat is to be either a right or a left hand mounted seat, the bottom seat bracket is inserted into the appropriate end of the seat shell and bonded in place.

The seat shell also has a top seat bracket slot molded in its back surface adjacent each end of the seat shell. The top seat bracket slot structure comprises a pair of laterally spaced slots for receiving a U-shaped metallic top seat bracket. As with the bottom seat bracket, the top seat bracket is also inserted into the appropriate slot and bonded in place. The U-shaped bracket has double bearing surface contact with the seat shell that distributes the forces placed upon the bracket by the weight of the seat and any load applied thereon.

Further adaptability of the cantilevered seat is provided by having a plurality of boss members integrally formed in the structural rib members of the seat shell with these boss members being symmetrically located in both of the upper corner areas of the back portion of the seat shell. These bosses are provided for attaching passenger assist handles to the seat. By having the boss member in predetermined locations, either a left hand or right hand passenger assist handle can be attached thereto, or even a second variety of passenger assist handle may be attached to either end.

The process for assembling the cantilevered seats starts by first determining whether it will be a right hand or a left hand mounted vehicle seat. Once this decision has been made, the appropriate seat mounting brackets are inserted and bonded into the desired end of the seat shell. Next the back pan is bonded to the seat shell. At this point the cantilevered seat is placed in a jig structure and the appropriate holes are drilled through the different points on the flange of the seat shell for insertion of the passenger assist handles and also the stud bolts upon which the cantilevered seat is mounted to the side wall of the transit vehicle.

DESCRIPTION OF THE DRAWINGS

FIG. 1 is a front perspective view of the novel cantilevered seat;

FIG. 1a is a cross section view taken along line 1a—1a of FIG. 1;

FIG. 2 is a rear perspective view of the novel cantilevered seat;

FIG. 3 is a side elevation view illustrating portions of the side broken away to show specific structure;

FIG. 4 is a partial rear elevation view of the back of the seat shell;

FIG. 4a is a partial view illustrating how the passenger assist handle would be attached to the opposite symmetrically formed end of the seat shell illustrated in FIG. 4;

FIG. 5 is a partial bottom elevation of the seat shell;

FIG. 6 is a cross-section taken along line 6—6 of FIG. 5;

FIG. 7 is a cross-section taken along line 7—7 of FIG. 5; and

FIG. 8 is a cross-section elevation view taken along line 8—8 of FIG. 4.

DESCRIPTION OF THE PREFERRED EMBODIMENT

Referring now to FIGS. 1 and 2, the cantilevered seat will be described. The cantilevered seat assembly is generally designated 10, and it has a seat shell 12 and a back pan 22. The seat shell has back recess portions 14 and seat recess portions 16 contoured into the front panel of the seat shell. The lateral flange 18 extends around the periphery of the seat shell 12. As seen in FIG. 1a the trim strip groove 20 extends along the left side of the seat shell up to its top and there across and finally downwardly adjacent the other end of the seat shell. The purpose of this groove is to allow the ends of a seat cover or fabric to be inserted into the groove and then a trim strip 21 would be pushed down into the groove to capture the end of the fabric or seat cover.

The rear of the seat shell 12 is illustrated in FIGS. 4 and 5. There it can be seen that the structural foam molded polycarbonate material has been symetrically designed so that the left half of the seat shell is substantially identical with the right half of the seat shell. Central vertical rib member 30 would be the symetrical center of the seat shell. Structural reinforcing rib members for the seat shell are vertical ribs 32, horizontal ribs 34, and diagonal ribs 36. The manner in which these structural ribs contact the back pan 22 is clearly illustrated in FIG. 8. There it can be seen that the back pan has a knee recess area 24, horizontal rib receiving channels 26, and vertical rib receiving channels 28. As was mentioned briefly in the summary, the seat shell is bonded to the back pan by an adhesive applied to the surfaces of the parts that contact each other.

The structure for mounting the seats is most clearly illustrated in FIGS. 3, 4 and 5. The bottom seat bracket 42 is basically J-shaped. It has bolt apertures 44 and 45 that are located adjacent the ends of the seat bracket 42. The seat bracket 42 is inserted into slot 40 that has been molded into the bottom of the seat shell. As was discussed previously, the opposite ends of the seat shell have identical slots 40 for receipt of bottom seat brackets. The mounting bolts 50 are inserted through mounting bolt bores 48 in the flange of the seat shell with their ends passing through the apertures in the seat mounting bracket. The mounting bolts have a base 52 that would be inserted into a channel that captures the base and which would run substantially the length of the vehicle.

The top seat mounting bracket 64 is inserted into slots 60 and 61 that have been molded into the back of the seat shell. This mounting bracket is also secured therein by some method of bonding. Top seat mounting bracket 64 is U-shaped and has an aperture 65 in one of its leg members for receiving mounting bolt 66. The base 68 of this bolt would also be captured in a channel extending substantially the entire length of the vehicle side wall.

A passenger assist handle 70 is attached to the top of the seat shell in the manner illustrated in FIGS. 4 and 4A. It can be seen in these figures that boss members 72 have been integrally formed in the structural rib members. The purpose of these boss members 72 is to receive self-threading screws that would be inserted through the back pan of the seat assembly and also through the seat handle to be secured in the seat shell. Numeral 70A represents the opposite end of seat handle 70. Element 70' designates an alternative seat handle design that could be attached to the cantilevered seat shell.

What is claimed is:

1. A cantilevered seat for a transit vehicle comprising:

a seat shell molded from structural foam plastic, said seat shell having contoured into its front surface two seat recess areas and two back recess areas, said seat shell being an integral member having a front panel with a laterally extending flange formed around its periphery, said rear surface of said seat shell having a plurality of integrally molded horizontal, diagonal and vertical structural rib members and substantially in the center of said seat shell is a major vertical structural rib member, the matrix formed by said vertical, diagonal and horizontal rib members being symetrical about said major vertical rib member whereby said seat shell can be used as either a right hand mounted or a left hand mounted cantilevered seat a back pan molded from structural foam plastic, said back pan having integrally molded channels on its inwardly facing surface for receiving said vertical and horizontal rib members extending outwardly from the rear surface of said seat shell.

2. A cantilevered seat for a transit vehicle as recited in claim 1 wherein said seat shell and said back pan are secured together as an integral member by an adhesive bonding material.

3. A cantilevered seat for a transit vehicle as recited in claim 2 wherein said back pan has a knee recess formed in its outwardly facing surface.

4. A cantilevered seat for a transit vehicle as recited in claim 3 wherein the depth dimension of the vertical and horizontal rib members directly behind said back recesses taper into the thickness of the front panel so that the back recess of the front panel comes into contact with the knee recess portion of the back pan.

5. A cantilevered seat for a transit vehicle as recited in claim 4 wherein said seat shell has a trim strip groove extending upwardly adjacent one of its lateral side flanges and then across the top of said seat shell and then downwardly adjacent its other lateral side flanges.

6. A cantilevered seat for a transit vehicle as recited in claim 1 wherein said seat shell has a bottom seat bracket slot molded into its bottom surface adjacent each end of said seat shell whereby said seat can be mounted to a vehicle wall from either of its ends.

7. A cantilevered seat for a transit vehicle as recited in claim 6 further comprising a bottom seat bracket having an elongated shape with a pair of spaced mounting bolt apertures therein, said bottom seat bracket being J-shaped with its long dimension mounted in the horizontal portion of the seat shell and its short foot portion mounted in the upright portion of the seat shell.

8. A cantilevered seat for a transit vehicle as recited in claim 6 further comprising top seat bracket slot means molded into said seat shell along its back surface adjacent each end of said seat shell whereby the top end of said seat can be mounted to a vehicle wall from either of its ends.

9. A cantilevered seat for a transit vehicle as recited in claim 8 wherein said top seat bracket means comprises a pair of laterally spaced slots for receiving a U-shaped top seat bracket.

10. A cantilevered seat for a transit vehicle as recited in claim 1 further comprising a plurality of boss members integrally formed in said structural rib members of the seat shell, said boss members being symmetrically located in both of the upper corner areas of the back portion of said seat shell whereby passenger assist handles can be attached to said seat whether said seat is to be mounted from the left or right side wall of a vehicle.

* * * * *